Nov. 3, 1931.    C. WEISHAAR    1,830,150
LESSON DRILL TABLET
Filed Sept. 30, 1930
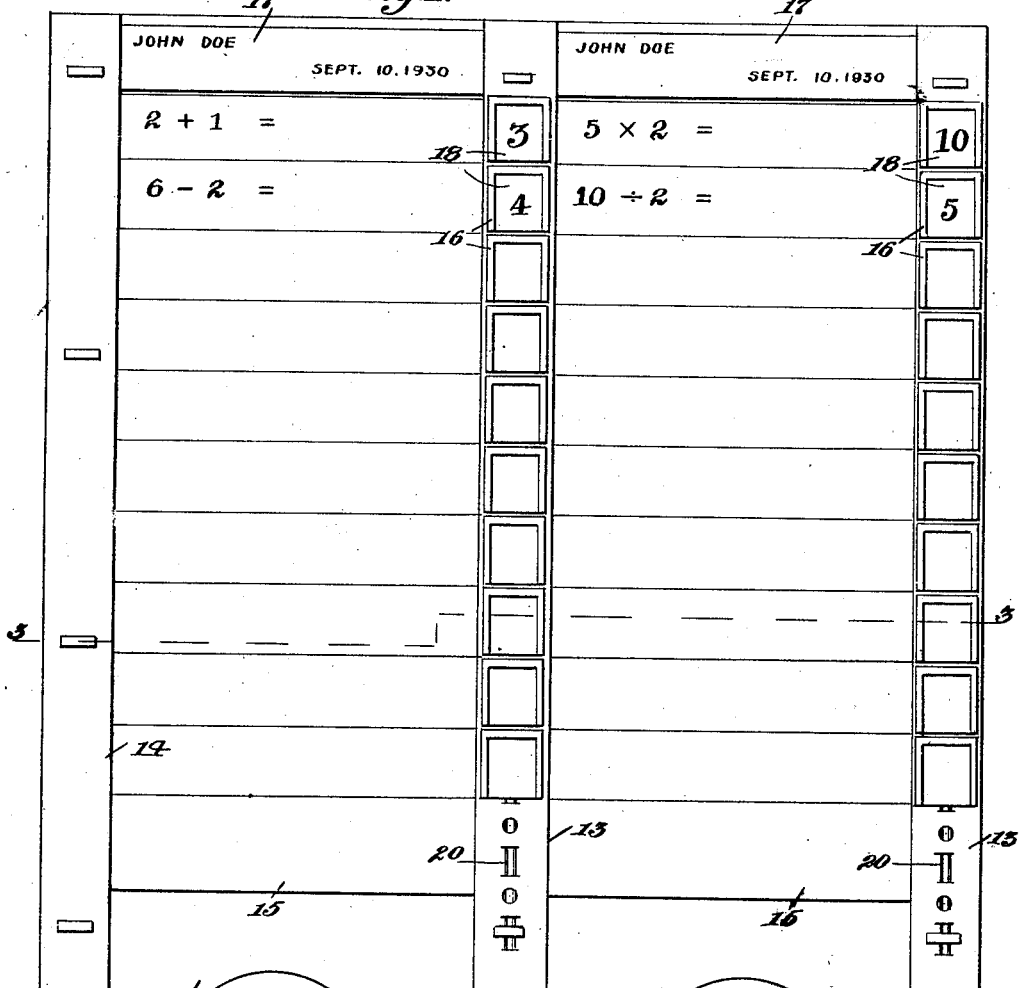
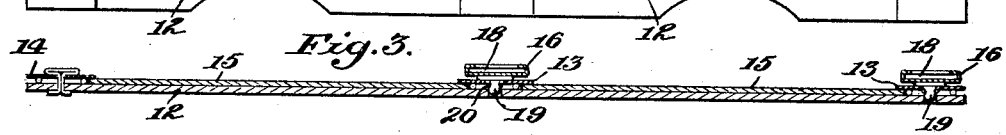
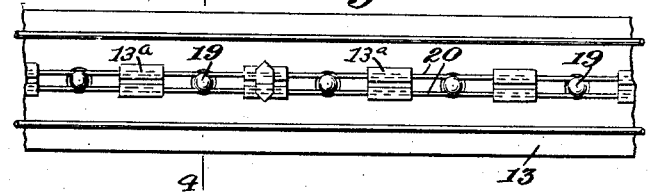
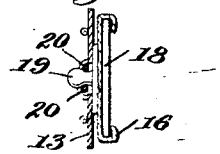

Patented Nov. 3, 1931

1,830,150

UNITED STATES PATENT OFFICE

CHRISTIAN WEISHAAR, OF ENGLISHTOWN, NEW JERSEY

LESSON DRILL TABLET

Application filed September 30, 1930. Serial No. 485,483.

This invention has for its object to provide a lesson drill tablet for the use of teachers and which is more especially intended as an arithmetic drill tablet in teaching the four ground rules of arithmetic, to wit: addition, subtraction, multiplication and division, although it may be used for other purposes, as in teaching facts in history or the sciences.

To this end the tablet comprises a backing adapted to hold one or more removable question cards or slips on which may be written or printed the problems or questions to be answered by the pupil, the question cards or slips being ruled transversely to afford a series of spaces on which the problems or questions may be written or printed. Attached to the tablet are one or more sheet metal strips on which are removably mounted a series of answer holding members or buttons registering with the spaces of the question cards or slips. At the top of the tablet, above the question slip or slips, one or more name or date slips or cards are removably mounted to identify the pupil, and, if desirable, to show the date when the drill tablets are given out.

In the accompanying drawings Fig. 1 is a front view of a tablet embodying a preferred form of the invention. Fig. 2 is a partial back view of one of the metallic strips showing the means for holding the answer buttons. Fig. 3 is a section on line 3—3, Fig. 1. Fig. 4 is a detail section on line 4—4, Fig. 2.

Referring to the drawings, 12 denotes a backing constituting the body of the tablet and which may be of stiff card board or any other suitable material. Attached to said backing, in the form of the invention herein shown, are two button-holding sheet metal strips 13, and a single sheet metal strip 14. These metal strips 13 and 14 are sufficiently loose on the backing 12 to permit the question cards or slips 15 to be removably slipped in beneath the edges of said sheet metal strips. Removably attached to the sheet metal slips 13 are answer buttons 16, and the question cards or slips 15 have transverse rulings affording spaces which register with said buttons.

On the top of the tablet, above the question slips 13, are small removable name or date slips 17. The word "top" refers to the tablet when held vertically, but if the tablet be placed horizontally the word "adjacent" would better describe the position of the slips 17 with reference to the slips 15.

The answer buttons 16 each preferably consists of a small piece of sheet metal having its side edges and top turned over. This construction affords a holder into which a small answer slip, as 18, may be removably inserted. These answer buttons are preferably attached to the sheet metal strips 13 by snap fasteners consisting, in the construction herein shown, of a ball member 19 pressed through an opening in a strip 13, and held in place on said strip by spaced spring wires 20 running lengthwise of the strip 13, said wires being held in place by small loops 13$^a$ struck from the said strips 13. The removably mounted answer buttons may be of any suitable size.

In the use of the invention each pupil will be given an individual tablet containing, in the spaces on the slips 15, the problems or questions to be answered; and these answers are to be written or printed on slips, as 18, which are to be inserted in the answer buttons. When the tablet with the answers are handed in the teacher may remove the answer buttons holding the correct answers which have been given to the problems or questions on the question slips, leaving the buttons having the slips containing the incorrect answers in place; or the buttons holding the incorrect answers may be removed, leaving the buttons, holding the correct answer slips, in place; and later, or on the following day, the tablet may be returned to the pupil to enable him or her to work out the correct answers to those questions previously answered incorrectly.

Simple problems in arithmetic, such as might be submitted to pupils in the primary classes, are shown on the question slips in the drawings, by way of illustration; but it will be understood that more complicated arithmetic problems might be submitted to the pupils on the question slips, or that questions of any other sort, for example, those relating to history, physics or other branches of learning, might be written on the question slips to be considered by the pupil.

While in the preferred form of the invention as herein shown and described two question slips are employed, the invention is not to be understood as being limited to the use of these two slips, as the tablet may comprise a single question slip, or more than two question slips, without departing from the scope of the invention.

The advantages of the use of the improved lesson drill may be stated as follows:

1. The teacher has an individual record in convenient form, of each pupil's daily work and progress.
2. It is a one-piece record.
3. The pupil wastes no time on known combinations.
4. The pupil spends his time in learning those combinations that are difficult for him.
5. It conserves the time of both teacher and pupil for essentials only.

While the invention is primarily intended for use in schools, as hereinbefore stated, it may be utilized for other purposes, as for holding memoranda in business offices and industrial plants, by employing the question slips as order slips, or otherwise, and the answer buttons for holding dates on which the orders are received or are to be filled, or other data. Other uses of the invention than as lesson drill tablets will therefore be understood as being possible for the construction herein shown and described and covered by the claims hereunto appended.

Having thus described my invention I claim and desire to secure by Letters Patent:—

1. A lesson drill tablet, for use in schools, comprising a suitable backing, sheet metal strips somewhat loosely attached to said backing, one or more question slips, having transverse rulings, removably held to the backing by being slipped beneath the edges of the said metal strips, answer buttons removably attached to one or more of said metal strips and registering with the spaces afforded by said transverse rulings, snap fasteners by which said buttons are attached to said metal strips and identifying slips or cards removably held to said backing adjacent said question slip or slips.

2. A lesson drill tablet, for use in schools, comprising a suitable backing, sheet metal strips somewhat loosely attached to said backing, one or more question slips, having transverse rulings, removably held to the backing by being slipped beneath the edges of the said metal strips, snap fasteners, and answer holders removably attached to one or more of said metal strips by said snap fasteners, said answer holders registering with the spaces afforded by said transverse rulings.

3. A tablet comprising a suitable backing, sheet metal strips somewhat loosely attached to said backing, one or more slips, having transverse rulings, removably held to the backing by being slipped beneath the edges of the said metal strips, snap fasteners, and answer holders removably attached to one or more of said metal strips by said snap fasteners, said answer holders registering with the spaces afforded by said transverse rulings.

4. A tablet comprising a suitable backing, sheet metal strips somewhat loosely attached to said backing, one or more slips, having transverse rulings, removably held to the backing by being slipped beneath the edges of the said metal strips, snap fasteners, answer holders removably attached to one or more of said metal strips by said snap fasteners, said answer holders registering with the spaces afforded by said transverse rulings, and answer slips removably mounted in said holders.

5. A lesson drill tablet, for use in schools, comprising a suitable backing, sheet metal strips somewhat loosely attached to said backing, one or more question slips, having transverse rulings, removably held to the backing by being slipped beneath the edges of the said metal strips, answer buttons removably attached to one or more of said metal strips and registering with the spaces afforded by said transverse rulings, and identifying slips or cards removably held to said backing adjacent said question slip or slips, said answer buttons each comprising a ball member, said metal strips having spaced spring wires attached thereto and between which said ball members may be forced, thus affording snap fastenings for said buttons.

In testimony whereof I affix my signature.

CHRISTIAN WEISHAAR.